US012560249B2

(12) United States Patent
Caillot et al.

(10) Patent No.: US 12,560,249 B2
(45) Date of Patent: Feb. 24, 2026

(54) HYDRAULIC VALVE FOR CONNECTING TWO TRANSVERSE PIPES

(71) Applicant: ABB SCHWEIZ AG, Baden (CH)

(72) Inventors: Alexandre Caillot, Viuz-la-Chiesaz (FR); Christopher Pierce, Gresy-sur-Aix (FR); Mahesh Vaze, Bangalore (IN); Subhashish Dasgupta, Bangalore (IN)

(73) Assignee: ABB SCHWEIZ AG, Baden (CH)

( * ) Notice: Subject to any disclaimer, the term of this patent is extended or adjusted under 35 U.S.C. 154(b) by 19 days.

(21) Appl. No.: 18/695,163

(22) PCT Filed: Sep. 22, 2022

(86) PCT No.: PCT/EP2022/076410
§ 371 (c)(1),
(2) Date: Mar. 25, 2024

(87) PCT Pub. No.: WO2023/046850
PCT Pub. Date: Mar. 30, 2023

(65) Prior Publication Data
US 2025/0164018 A1      May 22, 2025

(30) Foreign Application Priority Data

Sep. 24, 2021      (EP) ..................................... 21306325

(51) Int. Cl.
| | |
|---|---|
| *F16K 11/07* | (2006.01) |
| *F16K 5/04* | (2006.01) |
| *F16K 11/076* | (2006.01) |
| *F16K 11/085* | (2006.01) |

(52) U.S. Cl.
CPC .......... F16K 11/076 (2013.01); F16K 5/0407 (2013.01); F16K 11/0856 (2013.01)

(58) Field of Classification Search
CPC ............. F16K 11/0716; F16K 11/0856; F16K 27/065; F16K 5/0407
See application file for complete search history.

(56) References Cited

U.S. PATENT DOCUMENTS 5,172,725 A * 12/1992 Kitagawa ............ F16K 11/0856
137/625.43
2013/0130076 A1      5/2013 Lee et al.
(Continued)

FOREIGN PATENT DOCUMENTS

| | | |
|---|---|---|
| DE | 202010011413 U1 | 9/2011 |
| DE | 102015000424 B3 | 4/2016 |

(Continued)

OTHER PUBLICATIONS

Translation DE 202010011413 (Year: 2025).*

(Continued)

*Primary Examiner* — Kelsey E Cary
(74) *Attorney, Agent, or Firm* — CANTOR COLBURN LLP

(57) ABSTRACT

A hydraulic valve configured to connect a first pipe extending according to a first axis and a second pipe extending according to a second axis, the hydraulic valve comprising a body having two first ports that are aligned and configured to connect two fractions of the first pipe and two second ports that are aligned and configured to connect two fractions of the second pipe; a rotating shutter mounted in the body and configured to rotate according to an actuating axis that is transverse to the first axis and the second axis when the two first ports are connected to the first pipe and the two second ports are connected to the second pipe, the rotating shutter being provided with a first straight channel and a second straight channel, the first straight channel connecting the two first ports and the second straight channel connecting the two second ports in a closed angular position of the (Continued)

rotating shutter; the hydraulic valve further having a passage channel distinct from the first straight channel and the second straight channel and being configured to connect one of the first ports to one of the second ports in an open angular position of the rotating shutter.

16 Claims, 3 Drawing Sheets

(56)                    References Cited

U.S. PATENT DOCUMENTS

2013/0263949 A1 * 10/2013 Bartnick ............. F16K 11/0856
                                                        137/625
2022/0099216 A1 *  3/2022 Liu ........................ F16K 11/24

FOREIGN PATENT DOCUMENTS

FR          1452637  A      4/1966
GB           139959  A      3/1920
WO       2019206510  A1    10/2019

OTHER PUBLICATIONS

International Search Report corresponding to International Application No. PCT/EP2022/076410; Mailing Date, Dec. 2, 2022.
Written Opinion corresponding to International Application No. PCT/EP2022/076410; Mailing Date, Dec. 2, 2022.

* cited by examiner

HYDRAULIC VALVE FOR CONNECTING TWO TRANSVERSE PIPES

CROSS REFERENCE TO RELATED APPLICATIONS

This application is a National Stage of PCT Application No. PCT/EP2022/076410 filed on Sep. 22, 2022, which claims priority to European Patent Application No. 21306325.8 filed on Sep. 24, 2021, the contents each of which are incorporated herein by reference thereto.

TECHNICAL FIELD

The present disclosure concerns a hydraulic valve for connecting two transverse pipes.

BACKGROUND

It is known to use hydraulic valves in industrial manifolds for linking a plurality of pipes. The aim is to distribute products by opening and closing some of the hydraulic valves.

Such industrial manifolds are adapted for example for industries making lubricants and greases, paints and varnishes, paper, specialty chemicals or perfumes wherein raw fluids are used to prepare semi-finished products and finished products.

There is a need to clean the pipe and the valve to remove the remaining fluid at the end of the production process. The inner walls of the pipes as well as the inner walls of the hydraulic valves have to be cleaned.

A solution is to push and scrape the fluid with so-called pigs. A pig is a movable device with at least one external ring for scraping the walls of the inner walls.

It can be moved by a fluid under pressure inside the industrial manifold. The hydraulic valve can also be called piggable valve.

This technique is satisfying in that the inner walls can be cleaned. There is however a difficulty for the cleaning as the valves should be put in the convenient position to enable the circulation of the pig.

The geometry of the inner walls should also be adapted for pig circulation. This can be especially difficult for valves connecting pipes extending transversally with respect to each other. Thus, there is a need for a hydraulic valve that can be easily cleaned.

The present disclosure aims to solve all or some of the disadvantages mentioned above.

BRIEF SUMMARY

For this purpose, the present disclosure relates to a hydraulic valve configured to connect a first pipe extending according to a first axis and a second pipe extending according to a second axis, the hydraulic valve comprising:
- a body having two first ports that are aligned and configured to connect two fractions of the first pipe and two second ports that are aligned and configured to connect two fractions of the second pipe,
- a rotating shutter mounted in the body and configured to rotate according to an actuating axis that is transverse to the first axis and the second axis when the two first ports are connected to the first pipe and the two second ports are connected to the second pipe, the rotating shutter being provided with a first straight channel and a second straight channel, the first straight channel connecting the two first ports and the second straight channel connecting the two second ports in a closed angular position of the rotating shutter;
- the hydraulic valve further having a passage channel distinct from the first straight channel and the second straight channel and being configured to connect one of the first ports to one of the second ports in an open angular position of the rotating shutter.

In other words, the first straight channel constitutes a link between two portions of the first pipe to enable the circulation of a fluid. The second straight channel has the same function for the second pipe.

According to a possibility, the first straight channel and the second straight channel are respectively aligned with the first pipe and the second pipe so as to allow a pig to cross them. The hydraulic valve is a multi-way valve. It can also be called a piggable valve as it can be cleaned by a pig.

According to another possibility, the hydraulic valve is not configured to be cleaned by a pig.

In closed angular position, the first pipe is not linked with the second pipe. As the first pipe is independent from the second pipe, they can be washed and drained independently. This provision therefore enables to wash the first straight channel and the second straight channel with pigs in the closed angular position. In addition, in the open angular position, the first pipe is in fluid communication with the second pipe.

The change of position is easy and reliable as it simply necessitates a rotation of the rotating shutter.

According to an aspect of the present disclosure, the second axis is transversal to the first axis. Preferably, the first axis is comprised in a first plane and the second axis is comprised in a second plane parallel to and distant from the first plane.

Moreover, the hydraulic valve can have a compact design as the rotating shutter is mostly comprised between the first plane and the second plane and only with a limited parts outside.

According to an aspect of the present disclosure, the passage channel presents a section with a depth defined radially with respect to the actuating axis and a width that is transverse to the depth, the depth growing from the end regions toward the central region and the width decreasing from the end regions toward the central region.

In other words, when passing through the passage channel, the depth grows and then decreases and conversely for the width.

This provision enables to define a changing section that have a limited area fluctuation. This reduces the pressure loss inside the passage channel.

According to an aspect of the present disclosure, the rotating shutter presents an external recess, the passage channel being defined by said external recess and an internal face of the body.

This facilitates the manufacturing of the rotating shutter, as the passage channel is not an internal channel realized within. On the contrary, this is only necessary to create an external recess in the rotating shutter.

According to a possibility, the external recess is realized by machining the rotating shutter. According to other possibilities, the rotating shutter is realized by additive manufacturing or by molding, the external recess resulting of the fabrication.

According to an aspect of the present disclosure, the rotating shutter presents an external cylindrical face extending according to the actuating axis; the first straight channel, the second straight channel and the external recess being opening on said external cylindrical face.

This simple construction facilitates the construction of the rotating shutter and of the body.

The internal face of the body presents a tubular shape complementary to the external cylindrical face of the rotating shutter. The two first ports and the two second ports are made in said internal face.

According to an aspect of the present disclosure, the rotating shutter comprises at least one side seal ring being installed in a corresponding groove made in the external cylindrical face around a corresponding opening engendered by the first straight channel and/or the second straight channel.

According to an aspect of the present disclosure, the rotating shutter comprises four side seal rings being installed in corresponding grooves made in the external cylindrical face around the fours openings engendered by the first straight channel and the second straight channel.

This provision enables to seal each opening generated by the first straight channel and the second straight channel independently.

According to an aspect of the present disclosure, the rotating shutter comprises two front seal rings being installed in corresponding grooves made in the external cylindrical face that are extending transversally to the actuating axis, the first straight channel, the second straight channel and the passage channel being located between the two front seal rings according to the actuating axis.

The sealing of the external recess is done thanks to the combined effect of the four side seal rings and the two front seal rings as they defined an internal sealed area between the external cylindrical face, the internal recess and the internal face.

The forms of the grooves is then simple as they are circles for the front seals rings and ovals for the side seal rings. There is no need to define a groove and seal ring designed for constituting a contour of the external recess on the external cylindrical face. As well, this offer more freedom to define the shape of the external recess to optimize the fluid circulation by reducing the pressure loss.

According to an aspect of the present disclosure, the passage channel has an overall helical trajectory, the displacement between the closed angular position to the open angular position corresponding to a quarter turn of the rotating shutter.

This construction enables to define a section of the passage channel that has a comparable order of magnitude with the first straight channel and the second straight channel.

Indeed, as the first straight channel and the second straight channel are transverse, the helical trajectory of a quarter turn avoids them and has therefore more space.

According to an aspect of the present disclosure, the rotating shutter is provided with a stop wall located at an inlet of the passage channel, the stop wall being extending in front of a first port or a second port in open angular position to let a fluid flow through the passage channel and to stop a pig circulating in a the first pipe or second pipe outside the passage channel.

This provision enables to clean the first pipe or second pipe until the passage channel. As the passage channel has a form that is not adapted to the pig, the stop wall is a protecting element.

According to an aspect of the present disclosure, the rotating shutter is provided with two stop walls, each stop wall corresponding to an inlet of the passage channel.

According to an aspect of the present disclosure, the stop walls correspond to a portion of the external cylindrical face adjoined to the external recess. In other words, the external recess does not exactly correspond to the first port and second port in the open angular position. This contour difference engenders the stop walls.

According to an aspect of the present disclosure, the body presents an access window to an actuating element of the rotating shutter transversely to the actuating axis.

This provision enables to actuate the rotating shutter from the outside of the hydraulic valve. According to an aspect of the present disclosure, the actuating element is configured to be handled with an external actuator. The hydraulic valve is then compact as there is no embedded actuator.

According to an aspect of the present disclosure, the actuating element is a grip configured to cooperate with a complementary tool to rotate the rotating shutter.

The hydraulic valve is configured to be mechanically actuated. The overall size of the valve is therefore limited as there is no need for an embedded and individual pressured or hydraulic actuating system.

This provision enables to choose the kind of energy to pilot the mechanical action that is external to the hydraulic valve: it could be a robot arm, a pneumatic actuator, an electric actuator, a crank or handle, a screwdriver, etc.

According to an aspect of the present disclosure, the grip is an oblong orifice made in a transversal surface of an end of the rotating shutter.

The transversal surface is accessible through the access window and is transverse to the actuating axis. The oblong orifice facilitates the insertion of a tool and the change of position.

The present disclosure also concerns a manifold unit comprising at least two hydraulic valves as described above, wherein the two first ports and the two second ports of the at least two Hydraulic valves are configured to be plugged so as to align the first straight channels and the second straight channels when the at least two hydraulic valves are in closed angular position.

This provision enables to constitute a manifold unit wherein the hydraulic valves are aligned vertically and or horizontally. This manifold unit presents a small dimension due to the fact that the change of position is realized by the rotation of rotating members according to actuating axis that are parallel.

The present disclosure also concerns a robotized manifold system comprising at least one manifold unit as described above and a robot provided with an arm configured to cooperate with each rotating shutter of the at least two hydraulic valves.

This system is economical as one arm only is necessary to change the position of each hydraulic valve. There is no need to have a plurality of actuators controlled individually to operate the hydraulic valves.

The different aspects defined above that are not incompatible can be combined.

BRIEF DESCRIPTION OF THE FIGURES

The present disclosure will be better understood with the aid of the detailed description that is set out below with reference to the appended drawing in which.

DETAILED DESCRIPTION

Figure 1:
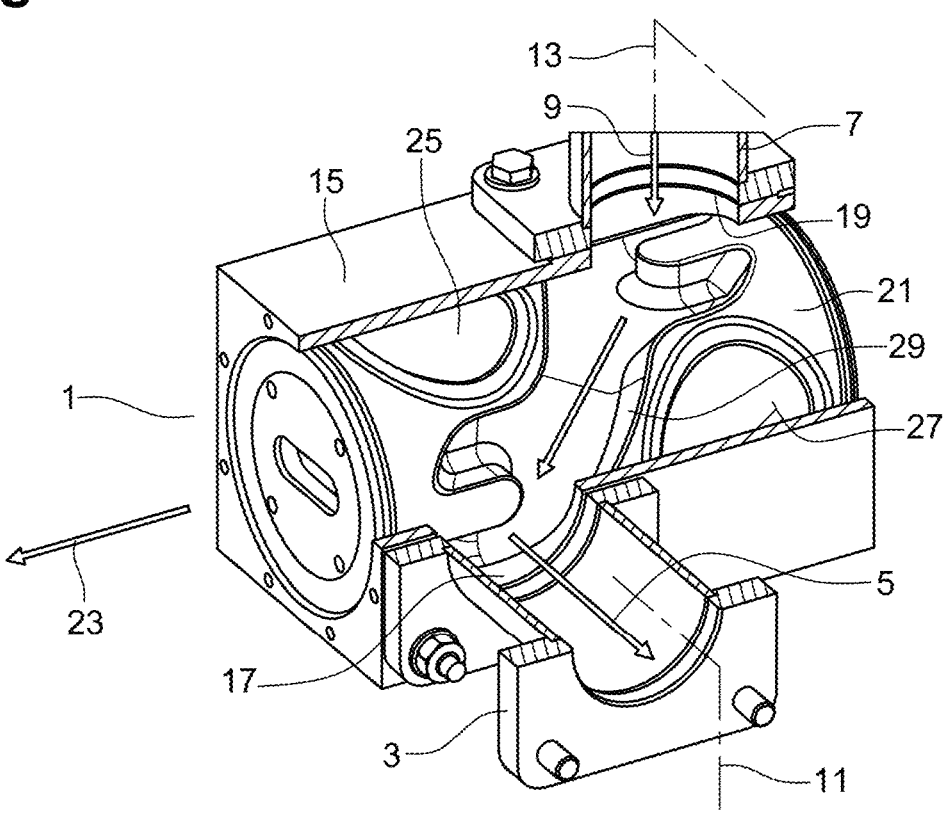
FIG. 1 is a partial cross-sectional view in perspective of a hydraulic valve in an open angular position.
Figure 2:
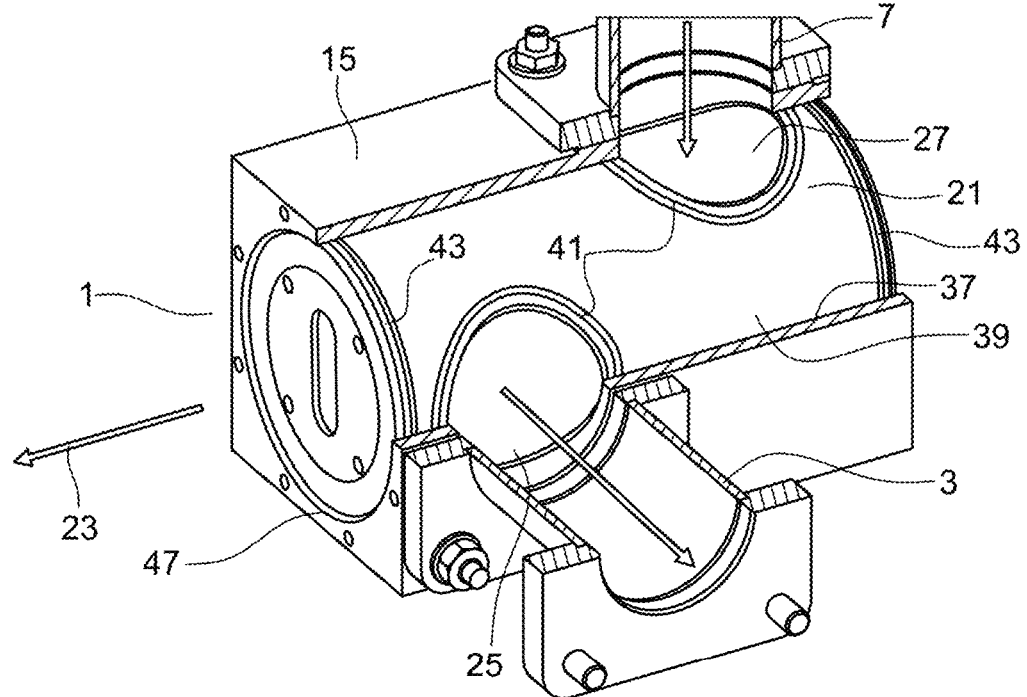
FIG. 2 is a partial cross-sectional view in perspective of the hydraulic valve in an closed angular position.

In the following detailed description of the figures defined above, the same elements or the elements that are fulfilling identical functions may retain the same references so as to simplify the understanding of the present disclosure.

As illustrated in FIGS. 1 to 4, a hydraulic valve 1 is configured to connect a first pipe 3 extending according to a first axis 5 and a second pipe 7 extending according to a second axis 9 that is transversal to the first axis 5.

The first axis 5 is comprised in a first plane 11 and the second axis 9 is comprised in a second plane 13 parallel to and distant from the first plane 11.

The hydraulic valve 1 comprises a body 15 having two first ports 17 that are aligned and configured to connect two fractions of the first pipe 3 and two second ports 19 that are aligned and configured to connect two fractions of the second pipe 7.

The hydraulic valve 1 comprises a rotating shutter 21 mounted in the body 15 and configured to rotate according to an actuating axis 23 that is transverse to the first plane 11 and the second plane 13 when the two first ports 17 are connected to the first pipe 3 and the two second ports 19 are connected to the second pipe 7.

The rotating shutter 21 is provided with a first straight channel 25 and a second straight channel 27, the first straight channel 25 connecting the two first ports 17 and the second straight channel 27 connecting the two second ports 19 in a closed angular position of the rotating shutter 21.

The hydraulic valve 1 further has a passage channel 29 distinct from the first straight channel 25 and the second straight channel 27 and configured to connect one of the first ports 17 to one of the second ports 19 in an open angular position of the rotating shutter 21.

In other words, the first straight channel 25 constitutes a link between two portions of the first pipe 3 to enable the circulation of a fluid. The second straight channel 27 has the same function for the second pipe 7.

The first straight channel 25 and the second straight channel 27 are respectively aligned with the first pipe 3 and the second pipe 7 so as to allow a pig to cross them.

In closed angular position, the first pipe 3 is not linked with the second pipe 7. As the first pipe 3 is independent from the second pipe 7, they can be washed and drained independently.

The passage channel 29 has an overall helical trajectory, the displacement between the closed angular position to the open angular position corresponding to a quarter turn of the rotating shutter 21.

Figure 3:
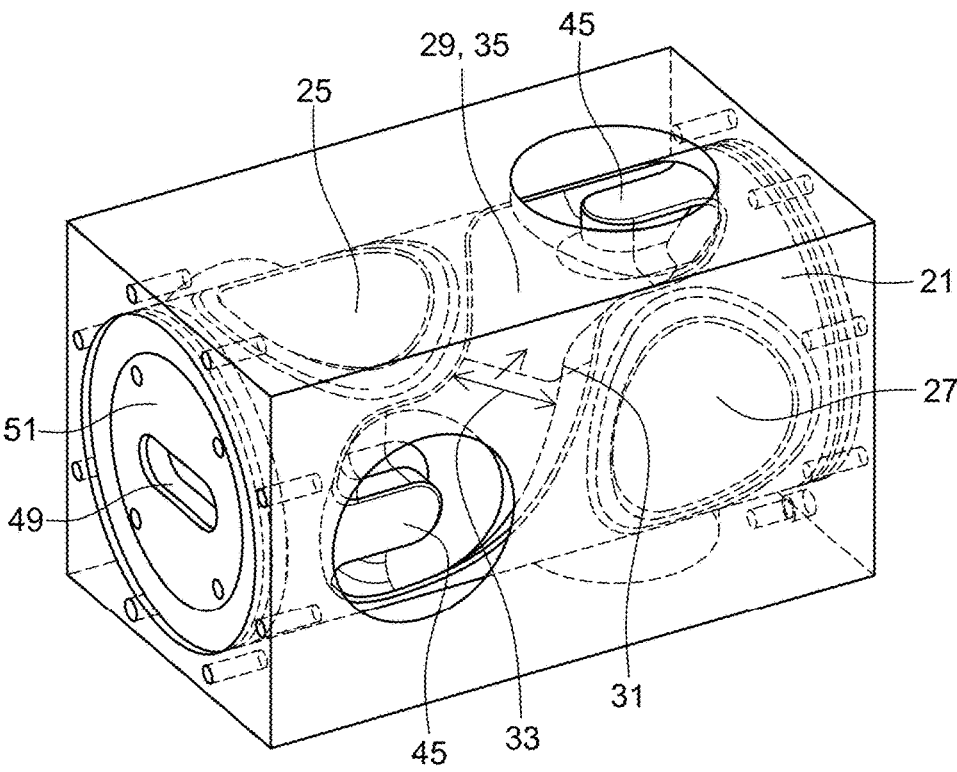
FIG. 3 is a partial cross-sectional view in perspective of a rotating shutter of the hydraulic valve.
Figure 4:
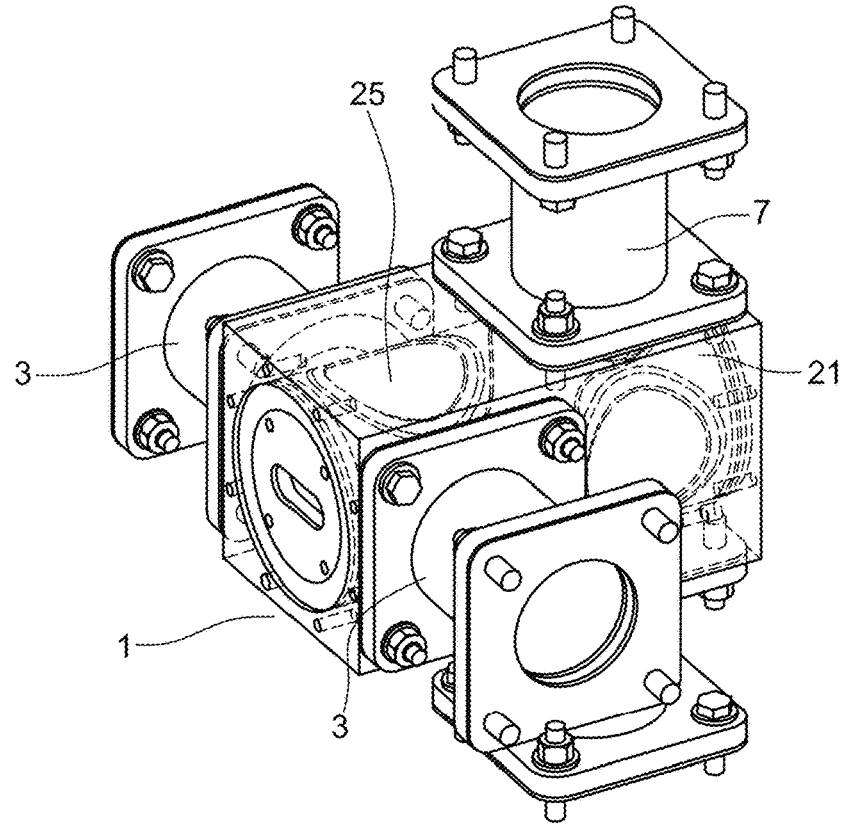
FIG. 4 is a partial cross-sectional view in perspective of the hydraulic valve in the open angular position connected to a first pipe and a second pipe.

As shown on FIG. 3, the passage channel 29 presents a section with a depth 31 defined radially with respect to the actuating axis 23 and a width 33 that is transverse to the depth 31, the depth 31 growing from the end regions toward the central region and the width 33 decreasing from the end regions toward the central region.

In other words, when passing through the passage channel 29, the depth 31 grows and then decreases and conversely for the width 33.

The rotating shutter 21 presents an external recess 35, the passage channel 21 being defined by said external recess 35 and an internal face 37 of the body 15.

The external recess 35 is realized by machining the rotating shutter 21.

The rotating shutter 21 presents an external cylindrical face 39 extending according to the actuating axis 23. The first straight channel 25, the second straight channel 27 and the external recess 35 are opening on said external cylindrical face 39.

The internal face 37 of the body 15 presents a tubular shape complementary to the external cylindrical face 39 of the rotating shutter 21. The two first ports 17 and the two second ports 19 are made in said internal face 37.

The rotating shutter 21 comprises four side seal rings 41 being installed in corresponding grooves made in the external cylindrical face 39 around the fours openings engendered by the first straight channel 25 and the second straight channel 27.

The rotating shutter 21 also comprises two front seal rings 43 being installed in corresponding grooves made in the external cylindrical face 39 that are extending transversally to the actuating axis 23, the first straight channel 25, the second straight channel 27 and the passage channel 29 being located between the two front seal rings 43 according to the actuating axis 23.

The rotating shutter 21 is provided with stop wall 45 located at each inlet of the passage channel 29, the stop wall 45 being extending in front of a first port 17 or a second port 19 in open angular position to let a fluid flow through the passage channel 29 and to stop a pig circulating in a the first pipe 3 or second pipe 9 outside the passage channel 29.

The stop walls 45 correspond to a portion of the external cylindrical face 39 adjoined to the external recess 35. In other words, the external recess 35 does not exactly correspond to the first port 17 and second port 19 in the open angular position. This contour difference engenders the stop walls 45.

The body 15 presents an access window 47 to an actuating element 49 of the rotating shutter 21 transversely to the actuating axis 23. The actuating element 49 is configured to be handled with an external actuator.

Here, the actuating element 49 is a grip configured to cooperate with a complementary tool to rotate the rotating shutter 21. The grip is an oblong orifice made in a transversal surface 51 of an end of the rotating shutter 21. The transversal surface 51 is accessible through the access window 47 and is transverse to the actuating axis 23.

Figure 5:
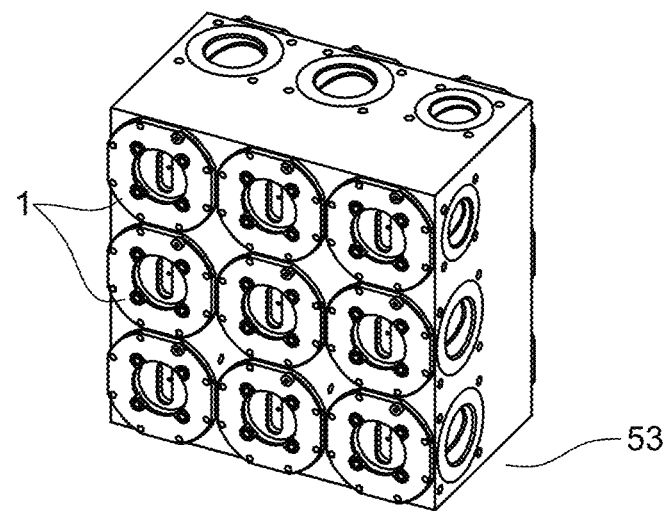
FIG. 5 is a perspective view of a manifold unit comprising nine hydraulic valves.
Figure 6:
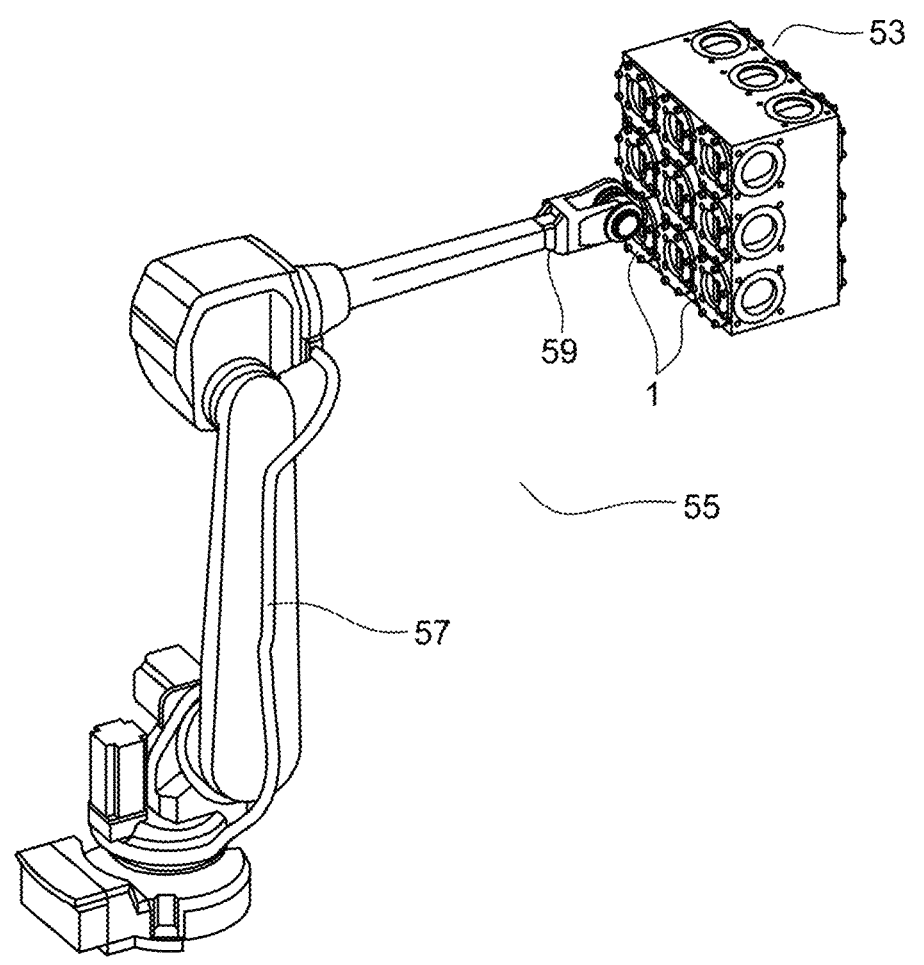
FIG. 6 is a perspective view of a robotized manifold.

As illustrated in FIGS. 5 and 6, a manifold unit 53 comprises nine hydraulic valves 1, wherein the two first ports 17 and the two second ports 19 of the nine hydraulic valves 1 are configured to be plugged so as to align the first straight channels 25 and second straight channels 27 when the nine hydraulic valves 1 are all in closed angular position.

A robotized manifold system 55 comprises the manifold unit 53 and a robot 57 provided with an arm 59 configured to cooperate with each rotating shutter 21.

The change of position is easy and reliable as it simply necessitates a rotation of each rotating shutter 21. Moreover, the hydraulic valves 1 can have a compact design as the rotating shutters 21 are mostly comprised between the first plane 11 and the second plane 13 and only with a limited parts outside.

This system is economical as one arm 59 only is necessary to change the position of each hydraulic valve 1. There is no need to have a plurality of actuators controlled individually to operate the hydraulic valves 1.

As goes without saying, the present disclosure is not limited to the sole embodiment described above by way of example, it encompasses all the variants.

The invention claimed is:

1. A hydraulic valve configured to connect a first pipe extending according to a first axis and a second pipe extending according to a second axis, the hydraulic valve comprising:

a body having two first ports that are aligned and configured to connect two fractions of the first pipe and two second ports that are aligned and configured to connect two fractions of the second pipe, a rotating shutter mounted in the body and configured to rotate according to an actuating axis that is transverse to the first axis and the second axis when the two first ports are connected to the first pipe and the two second ports are connected to the second pipe, the rotating shutter being provided with a first straight channel and a second straight channel, the first straight channel connecting the two first ports and the second straight channel connecting the two second ports in a closed angular position of the rotating shutter;

the hydraulic valve further having a passage channel distinct from the first straight channel and the second straight channel and being configured to connect one of the first ports to one of the second ports in an open angular position of the rotating shutter, wherein the passage channel presents a section with a depth defined radially with respect to the actuating axis and a width that is transverse to the depth, the depth growing from end regions toward a central region and the width decreasing from the end regions toward the central region.

2. The hydraulic valve according to claim 1, wherein the rotating shutter presents an external recess, the passage channel being defined by the external recess and an internal face of the body.

3. The hydraulic valve according to claim 2, wherein the rotating shutter presents an external cylindrical face extending according to the actuating axis; the first straight channel, the second straight channel and the external recess being opening on the external cylindrical face.

4. The hydraulic valve according to claim 3, wherein the rotating shutter comprises at least one side seal ring being installed in a corresponding groove made in the external cylindrical face around a corresponding opening engendered by the first straight channel and/or the second straight channel.

5. The hydraulic valve according to claim 4, wherein the rotating shutter comprises two front seal rings being installed in corresponding grooves made in the external cylindrical face that are extending transversally to the actuating axis, the first straight channel, the second straight channel and the passage channel being located between the two front seal rings according to the actuating axis.

6. The hydraulic valve according to claim 5, wherein the passage channel has an overall helical trajectory, a displacement between the closed angular position to the open angular position corresponding to a quarter turn of the rotating shutter.

7. The hydraulic valve according to claim 6, wherein the rotating shutter is provided with a stop wall located at an inlet of the passage channel, the stop wall being extending in front of a first port or a second port in open angular position to let a fluid flow through the passage channel and to stop a pig circulating in a the first pipe or second pipe outside the passage channel.

8. The hydraulic valve according to claim 7, wherein the body presents an access window to an actuating element of the rotating shutter transversely to the actuating axis.

9. The hydraulic valve according to claim 8, wherein the actuating element is a grip configured to cooperate with a complementary tool to rotate the rotating shutter.

10. The hydraulic valve according to claim 3, wherein the rotating shutter comprises two front seal rings being installed in corresponding grooves made in the external cylindrical face that are extending transversally to the actuating axis, the first straight channel, the second straight channel and the passage channel being located between the two front seal rings according to the actuating axis.

11. The hydraulic valve according to claim 1, wherein the passage channel has an overall helical trajectory, a displacement between the closed angular position to the open angular position corresponding to a quarter turn of the rotating shutter.

12. The hydraulic valve according to claim 1, wherein the rotating shutter is provided with a stop wall located at an inlet of the passage channel, the stop wall being extending in front of a first port or a second port in open angular position to let a fluid flow through the passage channel and to stop a pig circulating in a the first pipe or second pipe outside the passage channel.

13. The hydraulic valve according to claim 1, wherein the body presents an access window to an actuating element of the rotating shutter transversely to the actuating axis.

14. The hydraulic valve according to claim 13, wherein the actuating element is a grip configured to cooperate with a complementary tool to rotate the rotating shutter.

15. A manifold unit comprising at least two hydraulic valves according to claim 1, wherein the two first ports and the two second ports of the at least two Hydraulic valves are configured to be plugged so as to align the first straight channels and the second straight channels when the at least two hydraulic valves are in closed angular position.

16. A robotized manifold system comprising at least one manifold unit according to claim 15 and a robot provided with an arm configured to cooperate with each rotating shutter of the at least two hydraulic valves.

* * * * *